H. E. DOERR.
CAR TRUCK SIDE FRAME.
APPLICATION FILED DEC. 26, 1913.

1,097,970.

Patented May 26, 1914.

3 SHEETS—SHEET 1.

Witnesses:
Geo. R. Radson
C. M. Badger.

Inventor,
Harry E. Doerr.
By Bakewell & Cornwell Attys.

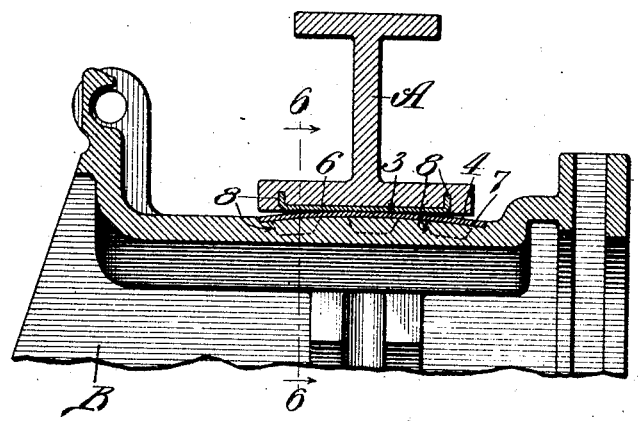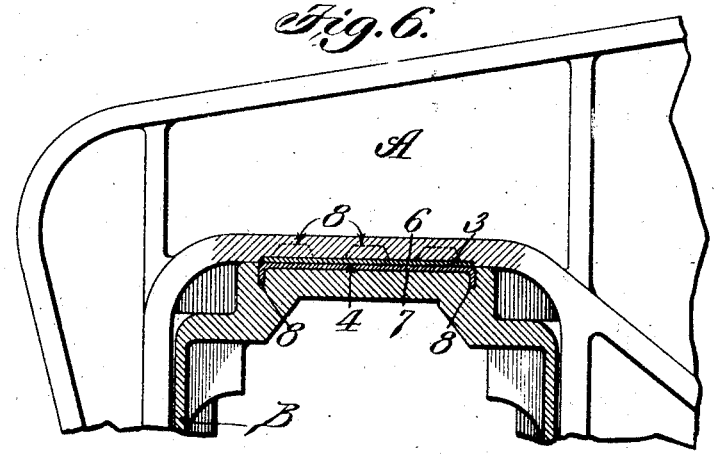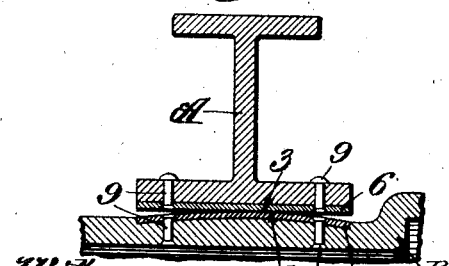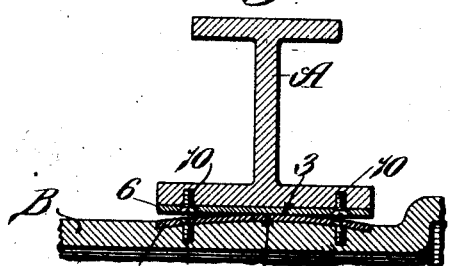

UNITED STATES PATENT OFFICE.

HARRY E. DOERR, OF ST. LOUIS, MISSOURI, ASSIGNOR TO SCULLIN-GALLAGHER IRON & STEEL COMPANY, OF ST. LOUIS, MISSOURI, A CORPORATION OF MISSOURI.

CAR-TRUCK SIDE FRAME.

1,097,970.

Specification of Letters Patent. Patented May 26, 1914.

Application filed December 26, 1913. Serial No. 868,839.

*To all whom it may concern:*

Be it known that I, HARRY E. DOERR, a citizen of the United States, residing at St. Louis, Missouri, have invented a certain new and useful Improvement in Car-Truck Side Frames, of which the following is a full, clear, and exact description, such as will enable others skilled in the art to which it appertains to make and use the same.

This invention relates to car truck side frames, and particularly to side frames of the type in which the journal-boxes are separate and distinct from the side frames and are combined with the side frames in such a manner that the parts of the truck can be disassembled easily.

The main object of my invention is to provide a novel car truck side frame of the type referred to, which is constructed in such a manner that the wedge or journal-bearing key that is usually arranged inside of the journal-box can be eliminated without sacrificing any of the functions performed by the journal-box wedges of the car trucks now in general use.

Another object is to provide a car truck side frame that comprises fewer parts and which can be manufactured at a lower cost than the side frames now in general use.

Other objects and desirable features of my invention will be hereinafter pointed out.

Figure 1:
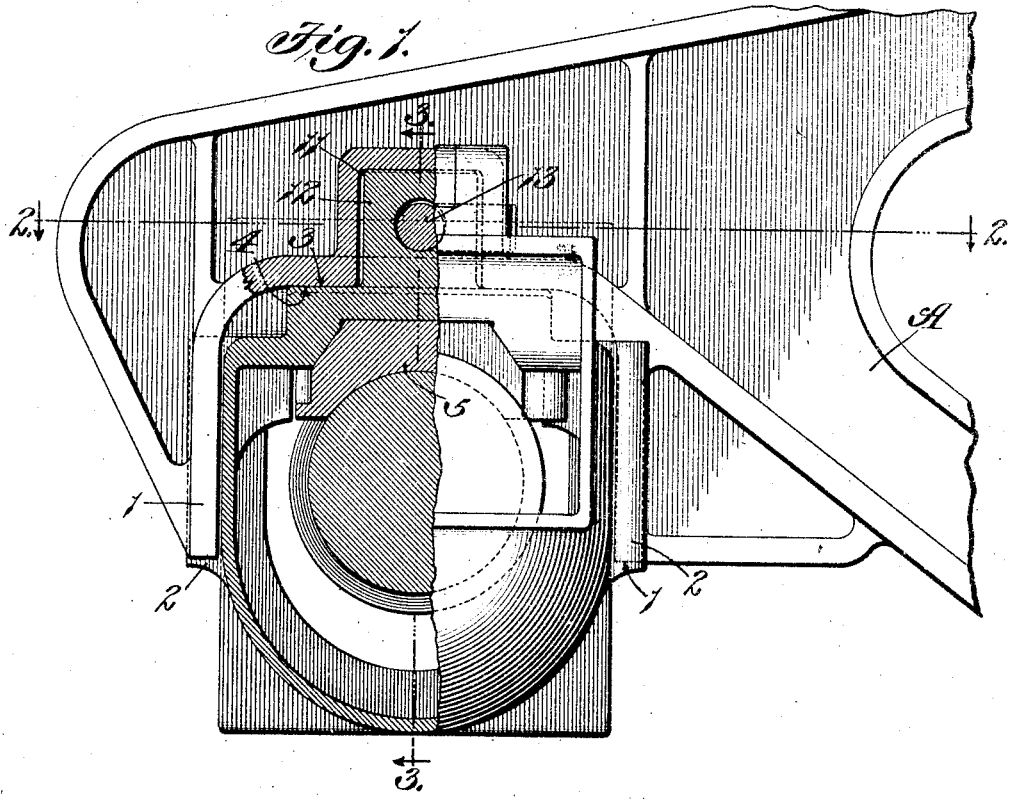
Figure 2:
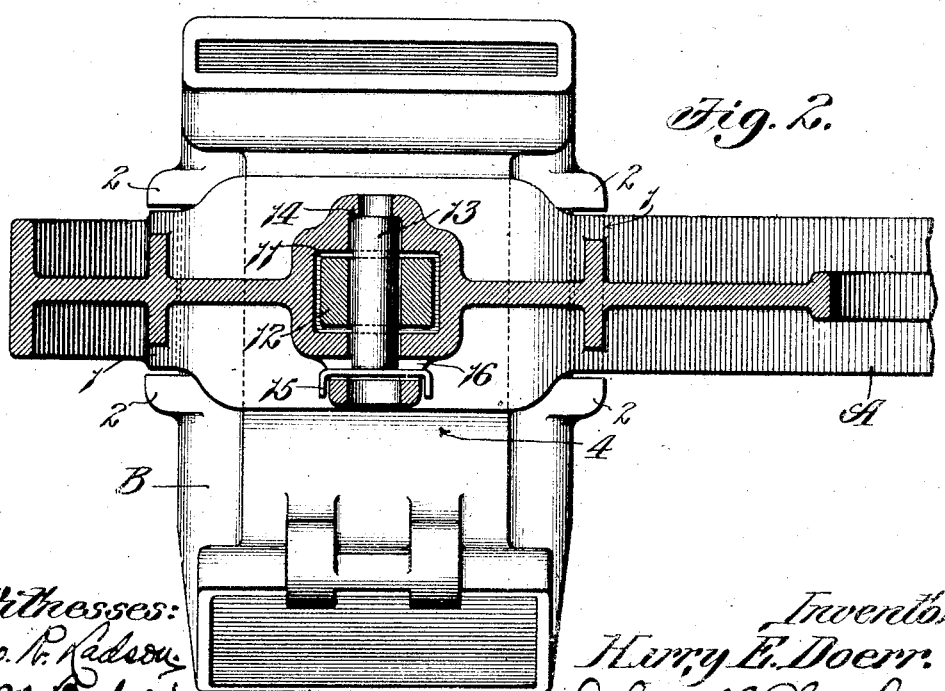
Figure 3:
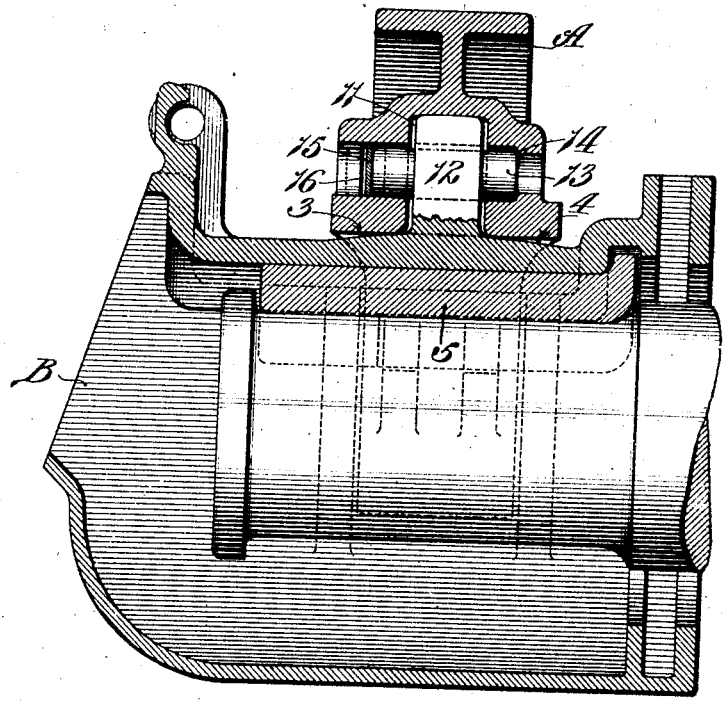
Figure 4:
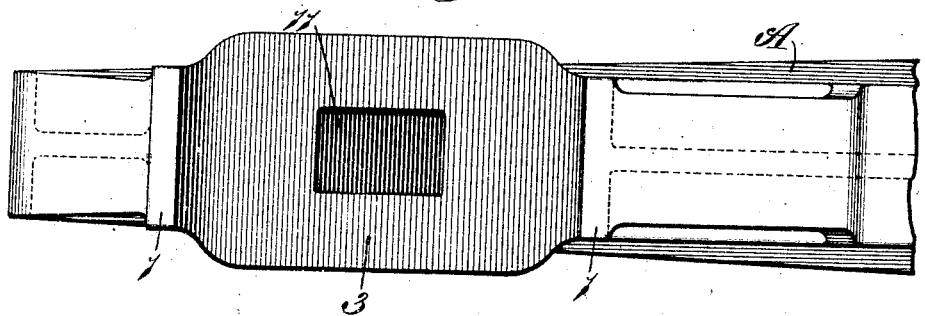

Figure 1 of the drawings is an elevational view, partly in vertical section, of a portion of a car truck side frame constructed in accordance with my invention; Fig. 2 is a horizontal sectional view taken on approximately the line 2—2 of Fig. 1; Fig. 3 is a vertical sectional view taken on approximately the line 3—3 of Fig. 1; Fig. 4 is a bottom plan view of that portion of the side frame that bears upon the top wall of the journal-box; Fig. 5 is a detail transverse sectional view illustrating a slight modification of my invention; Fig. 6 is a vertical sectional view taken on approximately the line 6—6 of Fig. 5; and Figs. 7 and 8 are detail sectional views illustrating further modifications of my invention.

Referring to Figs. 1 to 4 of the drawings which illustrate the preferred form of my invention, A designates a cast metal side frame, and B designates one of the journal-boxes that is mounted in the side frame. The side frame A is provided at each end with a pair of depending jaws 1, that coöperate with pairs of vertically disposed lugs 2, arranged on the side walls of the journal-box B, so as to prevent lateral displacement of said box with respect to said frame. A portion 3 on the side frame that is arranged between the jaws 1 bears against the top face 4 of the journal-box B. By referring to Fig. 3 it will be seen that the under side of the portion 3 is flat, or, in other words, lies in a true horizontal plane, while the top face 4 of the journal-box with which said portion coöperates is crowned slightly or curved convexedly in a transverse direction so as to provide coöperating bearings of relatively great area on the side frame and on the top wall of the journal-box. Such a construction permits the journal-box B to rock in a transverse direction independently of the frame; but this rocking motion is, of course, limited by the play allowed between the jaws 1 and the journal-box lugs 2. While I have herein shown the side frame as being provided with a flat bearing surface that coöperates with a curved bearing surface on the top wall of the journal-box, I do not wish it to be understood that my invention is limited to such a construction, for it is obvious that the same result could be obtained by forming the side frame bearing curved, and the coöperating bearing on the top wall of the journal-box flat, or by forming both bearing surfaces crowned so as to produce two oppositely-disposed surfaces, one of which rocks on the other. One advantage and desirable feature of such a construction is that the usual wedge or journal-bearing key can be eliminated, owing to the fact that the flat under side of the top wall 4 of the journal-box rests directly on the brass or journal-bearing 5. Another desirable feature of such a construction is that the journal-boxes can rock transversely of the side frames sufficiently to insure a uniform bearing on the journals without causing the top walls of the boxes or the portions of the side frame that rest upon same to wear out quickly, this, of course, being due to the fact that the coöperating bearing surfaces on the side frame and on the journal-boxes are of relatively great area and of such slight curvature that the weight is distributed over a large portion of the top wall of each box. If desired, the coöperating bearing surfaces 3 and 4 on the side frame and box may be reinforced by inserts of different material than that comprising the body of the side-frame and the top wall of the box, and in Figs. 6 to 8 I have illustrated such a construction wherein the portion 3 of the frame A is provided with an insert 6 and the coöperating portion 4 on the journal-box is provided with a similar insert 7. These inserts 6 and 7 are preferably formed of some hard, smooth, wear-resisting material; and, besides strengthening and reinforcing the car truck at this point, they greatly reduce the friction between the top of the journal-box and the side frame, and prevent excessive wear of the side frame and journal-box at this point.

In Figs. 5 and 6 I have shown the inserts 6 and 7 as being provided with ears or projections 8 which are embedded in the portions 3 and 4, respectively, during the process of casting same; but I do not wish to limit myself to this particular means for securing said inserts in position, for said inserts could be secured by means of rivets 9, as shown in Fig. 7, or by screws 10, as illustrated in Fig. 8. In the construction shown in Figs. 7 and 8, the inserts 6 and 7 can be renewed when excessively worn, thus materially prolonging the life of the truck.

Under ordinary conditions in service the weight of the side frame A resting on the journal-boxes B will keep said journal-box in operative position with respect to the side frame; but, under certain conditions, it may be found desirable to connect the journal-box to the frame in such a manner that it cannot become readily detached from said frame, as, for example, in case the truck is derailed, and in the embodiment of my invention herein shown I have illustrated a means for connecting the journal-box to the side frame, that is of novel construction, and which is adapted for general use in any type of side-frame in which the box is separate and distinct from the side-frame and is arranged between pedestal jaws on the side frame. Said means consists of a pocket 11 formed in the portion 3 of the side frame above the journal-box opening at the longitudinal center of the side frame, a perforated lug or projection 12 on the top wall of the journal-box that fits loosely in said pocket, as shown in Fig. 3, and a pin 13 that extends transversely of the side frame and which passes through the projection 12 and through openings in the side walls of the pocket 11, said pin being arranged in vertical alinement with the center axis of the car wheel journal, as shown in Fig. 1, and extending parallel to same, as shown in Fig. 3. In a truck of the particular design herein shown, namely, a truck in which the journal-boxes can rock transversely slightly with relation to the side frames, the openings in the lugs 12 through which the pins 13 pass should be made large enough to permit said lugs to rock slightly in the pockets 11 in the side frames. The inner end of the pin 13 butts against a shoulder 14 formed by reducing the inner end of the opening in the side wall of the pocket 11 through which said pin passes, as shown in Fig. 2, thus limiting the movement of the pin 13 in one direction, and said pin is retained in position by means of a locking device, preferably a cotter-key 15, that extends transversely across the outer end of the pin, and which is arranged in a slot 16 formed in the portion of the side-frame that constitutes the outer side wall of the pocket 11.

A side frame of the construction above described is symmetrical, and in view of the fact that the means which connects the journal-boxes to the side frame is arranged within the side frame, between the marginal edges of same, there is no liability of said connecting means being broken off when the truck is in use. Furthermore, such a structure can be manufactured at a low cost; it does not comprise bolts, nuts or similar retaining devices that are apt to work loose; and it can be assembled and disassembled easily, the reduced opening in the side frame at the inner end of the pin 13 making it possible to place a tool against the inner end of said pin and drive it out of the opening in the side frame in which the pin is seated.

Having thus described my invention, what I claim as new and desire to secure by Letters Patent is:

1. A car truck having a side frame provided with a bearing portion that is adapted to rest upon the top wall of the journal-box, a journal-box mounted in said frame and provided with a coöperating bearing portion, one of said bearing portions being convexed slightly so as to produce a crowned bearing surface of relatively great area that is curved transversely slightly with relation to the side frame, and an upwardly projecting lug on the top wall of said journal-box that fits in a pocket formed in the portion of the side frame that bears upon the top wall of the box.

2. A car truck having a side frame provided with a bearing portion that is adapted to rest upon the top wall of the journal-box, a journal-box mounted in said frame and provided with a coöperating bearing portion, one of said bearing portions being convexed slightly so as to produce a crowned bearing surface of relatively great area that is curved transversely slightly with relation to the side frame, and means inclosed by the side frame and located between the marginal edges of the side frame for connecting said journal-box and side frame together.

3. A car truck side frame provided with pedestal jaws for embracing a journal-box, a journal-box arranged between said jaws, coöperating bearing surfaces of relatively great area on the side frame and on the top wall of the journal-box, one of said bearing surfaces being convexed so as to form a crowned surface that is curved transversely with relation to the side frame, a lug on the top wall of the journal-box that projects upwardly into a pocket formed in the portion of the side frame which constitutes a bearing surface for the top wall of the box, and a locking device in the side frame that extends transversely of same and passes through said lug.

4. A side frame for car trucks provided with jaws for embracing the sides of the journal-box and with a horizontally-disposed portion for bearing upon the top wall of the journal-box, said horizontally-disposed bearing portion having a pocket formed therein between the marginal edges of the side frame for receiving a lug on the top wall of the journal-box.

5. A side frame for car trucks provided with jaws for embracing the sides of the journal-box and with a horizontally-disposed portion for bearing upon the top wall of the journal-box, said horizontally-disposed bearing portion having a pocket formed therein between the marginal edges of the side frame for receiving a lug on the top wall of the journal-box, the side walls of said pocket being provided with openings for receiving a locking device that coöperates with said lug and which extends transversely of the side frame.

6. A side frame for car trucks provided with jaws for embracing the sides of the journal-box and with a horizontally-disposed portion for bearing upon the top wall of the journal-box, said horizontally-disposed bearing portion having a pocket formed therein between the marginal edges of the side frame for receiving a lug on the top wall of the journal-box, the side walls of said pocket being provided with alining openings for receiving a retaining pin that extends transversely of the side frame through said lug, a shoulder or abutment on the side frame against which one end of said pin bears, and means for enabling said pin to be locked in the side frame.

7. A side frame for car trucks provided with jaws for embracing the journal-box and with a horizontally-disposed portion for bearing upon the top wall of the journal-box, a pocket formed in said horizontally-disposed bearing portion for receiving a projection on the top wall of the journal-box, and a transversely-disposed opening in the portion of the side frame that constitutes the side walls of said pocket, said opening being reduced adjacent one end so as to form a shoulder that limits the movement of a retaining device which is adapted to be inserted therein.

8. A car truck having a side frame that is provided with a journal-box opening, a journal-box arranged in said opening and provided on its top wall with a lug that projects upwardly into a pocket formed in the portion of the side frame that extends across the journal-box opening, and a removable retaining device that extends transversely of the side frame and engages said lug so as to connect the journal-box and side frame together.

9. A car truck side frame provided with jaws for embracing a journal-box and with a horizontally-disposed portion for bearing upon the top wall of the journal-box, a journal-box arranged between said jaws and provided with a lug that projects upwardly into a pocket formed in the horizontally-disposed bearing portion of the side frame that rests upon the journal-box, and a removable locking-pin that passes transversely through coöperating openings in the side frame and in said lug.

10. A car truck side frame provided with jaws for embracing a journal-box and with a horizontally-disposed portion for bearing upon the top wall of the journal-box, a journal-box arranged between said jaws and provided with a lug that projects upwardly into a pocket formed in the horizontally-disposed bearing portion of the side frame that rests upon the journal-box, a removable locking-pin that passes transversely through coöperating openings in the side frame and in said lug, and means on the side frame for retaining said pin in position.

11. A car truck side frame provided with jaws for embracing a journal-box and with a horizontally-disposed portion for bearing upon the top wall of the journal-box, a journal-box arranged between said jaws and provided with a lug that projects upwardly into a pocket formed in the horizontally-disposed bearing portion of the side frame that rests upon the journal-box, a removable locking-pin that passes transversely through coöperating openings in the side frame and in said lug, a shoulder on the side frame against which one end of said pin bears, and a removable device on the side frame for locking said pin in position.

12. A car truck provided with a side frame, a journal-box mounted therein, a horizontally-disposed portion on the side frame that coöperates with a bearing portion on the top wall of the journal-box, and a removable wear plate arranged in one of said bearing surfaces.

13. A car truck provided with a side frame, a journal-box mounted therein, a horizontally-disposed portion on the side frame that coöperates with a bearing portion on the top wall of the journal-box, said coöperating bearing surfaces being formed from metal of a different character than that from which the side frame and journal-box are formed.

14. A car truck provided with a cast metal side frame, a cast metal journal-box mounted in the side frame and provided with a crowned or convexed upper surface, and a substantially flat bearing surface on the side frame that coöperates with the convexed surface on the journal-box, said coöperating bearing surfaces being formed from metal that is of a different nature than the metal from which the side frame and the journal-box are formed.

In testimony whereof I hereunto affix my signature in the presence of two witnesses, this 22nd day of December 1913.

HARRY E. DOERR.

Witnesses:
  HARRY C. DREIBUSS,
  CHARLES P. GORMAN.